United States Patent [19]

Glass

[11] 4,388,328

[45] Jun. 14, 1983

[54] SORBITOL CONTAINING MIXTURE ENCAPSULATED FLAVOR

[75] Inventor: Michael Glass, Flushing, N.Y.

[73] Assignee: Warner-Lambert Company, Morris Plains, N.J.

[21] Appl. No.: 311,572

[22] Filed: Oct. 15, 1981

[51] Int. Cl.$^3$ .............................................. A23L 1/22
[52] U.S. Cl. ........................................ 426/3; 426/96; 426/650; 426/651; 426/548
[58] Field of Search ................. 426/96, 650, 651, 548, 426/3

[56] References Cited

U.S. PATENT DOCUMENTS

| | | | |
|---|---|---|---|
| 2,566,410 | 9/1951 | Griffin | 426/651 X |
| 2,856,291 | 10/1958 | Schultz | 426/651 X |
| 2,904,440 | 9/1959 | Dimick | 426/650 X |
| 3,928,633 | 12/1975 | Shoaf et al. | 426/96 |
| 3,956,507 | 5/1976 | Shoaf et al. | 426/96 |
| 4,146,653 | 3/1979 | Mader et al. | 426/548 X |

*Primary Examiner*—Joseph M. Golian

*Attorney, Agent, or Firm*—Daniel A. Scola; Gary M. Nath

[57] ABSTRACT

A flavor composite comprises a mixture of sorbitol, mannitol, saccharin, and a flavor material contained therein. Preferably, the saccharin is present in an amount of 3% by weight of the mannitol. The presence of mannitol and saccharin is theorized to lower the congealing temperature of sorbitol, so that volatile flavors may be incorporated therein with minimal flavor loss.

The present flavor composite may be prepared in the form of sugar-free candies, or may be reduced to particles or beads, having particle sizes appropriate for incorporation into comestible products such as chewing gums.

A method of preparing the flavor composites is also disclosed, which utilizes seed particles containing sorbitol, added to the mixture after the flavor to assist in the commencement of hardening.

15 Claims, No Drawings

SORBITOL CONTAINING MIXTURE ENCAPSULATED FLAVOR

BACKGROUND OF THE INVENTION

1. Field of the Invention

The present invention relates to the preparation of flavors useful for candy and chewing gum, and more particularly to the preparation of such flavors in a form that provides improved shelf stability and flavor sensation.

2. Description of the Prior Art

While a wide variety of flavors have been formulated for incorporation into candies and chewing gums, one of the problems attending the development of these products in novel flavor forms, has been the tendency of the flavor to diminish rapidly in intensity, and thereafter disappear within a relatively short period of time. This deficiency is most noteworthy in the instance of chewing gums, as flavor loss frequently occurs within the first four to five minutes of chewing.

The similar problem is observed in the instance where the product is stored for a period of time between manufacture and consumption. The flavors likewise tend to exhibit undesirably limited shelf stability, and, in some cases, may diminish to an unacceptably low level within one month after storage.

Several efforts have been made to remedy the aforenoted deficiencies by the preparation of flavors in encapsulated forms. Specifically, U.S. Pat. Nos. 3,795,744 and 3,826,847, by Ogawa et al., encapsulate a variety of flavors by homogeneously dispersing the flavors in a solution of water soluble high molecular weight compounds, such as polyvinyl esters, cellulose derivatives, and the like. The approach taken in Ogawa et al. possesses certain drawbacks, in that the high molecular weight material must be combined with plasticizers and solvents, before the addition of the flavor, and precipitation of the encapsulated flavor beads is accomplished by the addition of a hydrocarbon solvent such as hexane, which must be thereafter volatized off. Thus, in addition to introducing undesirable compounds, the Ogawa et al. preparation is unduly complex.

Further activity in the area of encapsulation of food additives, has centered around the efforts to prolong the stability of the artificial dipeptide sweetener known commonly as APM. In particular, U.S. Pat. No. 3,928,633 to Shoaf et al. proposes to encapsulate APM by dispersion within a material capable of being processed by hot melt techniques, and thereafter cooled to form an amorphous matrix containing the APM. The patent discloses, as one of the acceptable hot melt ingredients, polyhydric alcohols such as sorbitol. While the disclosure of Shoaf et al. may be relevant to the encapsulation of APM, the temperatures at which the patented procedure operates, are too high for the encapsulation of many desirable flavors, which would be lost by volatization, if they were incorporated into the encapsulant matrix. Sorbitol itself, congeals at a temperature that is too high to permit it to operate individually as an effective encapsulant.

Also, the chemistry of APM differs from that of food flavors, and analogies in operation and effect of encapsulants may not be properly drawn.

A specific preparation of sorbital encapsulated flavors is disclosed in U.S. Pat. No. 2,904,440, to Dimick et al. The patentees attempt to improve shelf stability by pretreating the flavor essence to remove certain low molecular weight alcohols, and compounds that behave like such alcohols. The patentees suggest that these alcohols inhibit the solidification of the sorbitol matrix, and attack the solidified matrix to cause it to break down and release the flavor.

Apart from this pretreatment of the flavor, however, Dimick et al. conform to the prior art, as they merely incorporate the treated flavor into melted sorbitol, add some seed crystals of sorbitol, and cool the melt to about 80° C. to commence crystallization. The nature of this processing, however, fails to encapsulate and safely retain the flavor completely within the sorbitol matrix, and the Dimick et al. preparation is inoperable for those flavors that volatize at the processing temperatures above 70° C.

A need therefore exists to develop a method and associated product that extends the shelf life of a wide variety of flavorings, without introducing undesired synthetic compounds to the ultimate food product, and which may be accomplished with a minimum expenditure of materials, energy and time.

SUMMARY OF THE INVENTION

In accordance with the present invention, a flavor composite is prepared which comprises a mixture of the sugar alcohols, sorbitol and mannitol, together with a quantity of saccharin, and at least one flavor contained within the sugar alcohol and saccharin mixture. The saccharin content of the mixture preferably comprises about 3% by weight based on the mannitol content of the mixture. Preferably, the saccharin is present in an amount of from about 0.15% to about 0.16% by weight of the flavor composite, and the mannitol is present in an amount of from about 5% to about 6% by weight thereof.

The remainder of the present flavor composite may comprise up to about 11% by weight of flavor, and preferably up to about 10% by weight, with the balance of the mixture comprising sorbitol. Preferably, a portion of the aforementioned ingredients are added as seed particles containing sorbitol. The seeds may either be derived from a previously prepared flavor composite, or may comprise sorbitol, alone. The seed particles are added in an amount of up to about 7% by weight, to promote cystallization of the composite, as described later on herein. Also, the sorbitol employed herein may be of the type that forms a gamma polymorphic crystal structure.

One of the features of the present invention, is that the presence of the mannitol and saccharin components within the aforementioned proportions with respect to each other, substantially lowers the melting point of sorbitol, to within a temperature range that facilitates the efficient incorporation into the mixture of a variety of volatile flavors. Thus, the eutectic mixture of sorbitol, mannitol and saccharin when prepared within the aforementioned ranges, exhibits a melting point less than 70° C., which facilitates flavor addition without unwanted volatilization or "flash off", and the corresponding loss of flavor ingredient during preparation.

The present invention includes a method for preparing a flavor composite comprising the steps of preparing a mixture of sorbitol, mannitol and saccharin, heating the mixture to a temperature of about 200° C., cooling the heated mixture to a temperature below about 70° C., thereafter adding at least one flavor to the mixture under agitation to uniformly disperse the flavor in the mixture. Further, a quantity of seed particles derived as noted above is added to the mixture, either from a previously prepared batch of the composite, or from ground crystalline sorbitol particles, alone. Finally, the mixture is permitted to solidify so that the flavor composite in final form may be recovered. The sorbitol crystallizes and solidifies rapidly, and the resulting composite may be quickly recovered, in sheet, droplet or particulate form.

The present flavor composite possesses a variety of applications, and may be incorporated with other ingredients as the flavor component of a variety of comestible products, including candy, chewing gums, and baked goods. In the instance where the present composite is cast into droplet or tablet form, it forms individual sugarless candies which may be consumed as such.

In a preferred embodiment, the present flavor composite is prepared in granular form, to serve as flavor beads for addition to a variety of products where a long lasting flavor component is desirable. The present flavor composites exhibit improved shelf stability, and may be stored for periods of up to a year with acceptable flavor loss.

Accordingly, it is a principal object of the present invention to prepare a flavor composite utilizing sorbitol as a primary encapsulant.

It is a further object of the present invention to provide a flavor composite as aforesaid that contains a minimum of ingredients therein.

It is a further object of the present invention to provide a method for the preparation of a flavor composite that may be simply and rapidly practiced.

It is a still further object of the present invention to provide a method as aforesaid, that produces a composite exhibiting greatly improved shelf life.

Other objects and advantages will become apparent to those skilled in the art from a consideration of the ensuing detailed description.

DETAILED DESCRIPTION

The flavor composite of the present invention comprises a mixture of sorbitol, mannitol, and saccharin, and at least one flavor contained within the mixture.

Both sorbitol and mannitol are well known sugar alcohols that have been utilized in comestible products as excipients, carriers, sweeteners, and bulking agents in chewing gums. Both sorbitol and mannitol are available from natural plant sources, and may be prepared by the electrolytic reduction of glucose, and by techniques well known in the art.

One of the features of the present invention comprises the combination of sorbitol, mannitol and saccharin, to facilitate the use of sorbitol as an encapsulating medium for flavor. One of the difficulties experienced in the prior art, as noted earlier, is that sorbitol alone possesses an undesirably high congealing point, on the order of about 90° C., that renders the incorporation of many volatile flavors impractical or impossible. The combination of mannitol and saccharin, prefererably in the proportions with respect to each other whereby saccharin is present in amount of about 3% by weight of the mannitol, modifies the thermal properties of sorbitol in combination therewith, and, in effect, forms a lowered congealing point eutectic, that facilitates the addition and incorporation thereinto of flavors.

Preferably, the sorbitol, mannitol and saccharin are combined in a mixture, with reference to the final flavor-containing composite wherein mannitol is present in an amount ranging from about 5% to about 6% by weight thereof, saccharin is present in an amount ranging from about 0.15% to about 0.16% by weight thereof, and sorbitol comprises the balance. The flavor may be added in amounts of up to about 11% by weight, and preferably up to about 10% by weight of the total composite.

While reference is made to saccharin generally, it is to be understood that the edible salts thereof, such as sodium, calcium and ammonium are also useful and therefore are included within the scope of the present invention.

The flavors useful in accordance with the present invention are all of the flavors well known for use in food applications. Thus, such flavors may include those derived from essential oils, as well as those flavors characterized as either natural or artificial fruit flavors. Also, the flavors within the scope of the present invention would include bean-derived flavors, wine-derived flavors and pungent materials commonly known as spices.

More particularly, flavors useful in the present invention include essential oils such as cinnamon, spearmint, peppermint, birch, anise and the like; natural fruit flavors derived from the essence of fruits such as apple, pear, peach, strawberry, cherry, apricot, orange, watermelon, banana and the like; bean-derived flavors such as coffee, cocoa and the like; wine-derived flavors such as curacao zin, other fermented fruit flavors, and the like; and pungent materials such as affinin, pepper, mustard and the like.

The foregoing flavors may be prepared individually, or, where appropriate, may be prepared in combination with each other. Thus, the above flavors may be individually incorporated within the sorbitol mixture, and may thereafter be granulated and mixed in combination with each other to impart specific flavor effects to food products.

The amount of flavor incorporated into the sorbitol mixture may vary widely, depending in part, upon the thermal properties of the individual flavor, as well as upon the specific product being prepared. For example, in the instance where the flavor is relatively stable at the temperature at which it is added to the sorbitol mixture, a greater quantity of flavor may be easily added to form the desired composite. Further, in the instance where a sorbitol candy is to be prepared, the amount of flavor added to the candy may differ from the instance where the prepared composite is to be granulated and utilized as flavor crystals for incorporation into another food product.

In general, the present composite may contain up to about 11% by weight of flavor, and preferably up to about 10% by weight of such flavor with amounts ranging from 0.1% by weight up to 10% being most preferred. Naturally, the exact amount of flavor added may vary within the scope of the present invention.

The present flavor composites may include various ingestible colorants, therefore suitable for food application. For example, pigments such as titanium dioxide as well as dyes suitable for food, drug and cosmetic applications, known as F.D. & C. dyes and lakes, may be utilized. Acceptable dyes and lakes are preferably water-soluble, and include indigoid dye, known as F.D. & C.

Blue No. 2, which is the disodium salt of 5,5'-indigotindisulfonic acid. Similarly, the dye known as F.D. & C. Green No. 1, comprises a triphenylmethane dye and is the monosodium salt of 4-[4-(N-ethyl-p-sulfobenzylamino)diphenylmethane]-[1-N-ethyl-N-p-sulfoniumbenzyl)-$\Delta^{2,5}$-cyclohexadienimine]. A full recitation of all F.D. & C. and D. & C. and their corresponding chemical structures may be found in the Kirk-Othmer Encyclopedia of Chemical Technology, at Volume 5, Pages 857–884, which text is accordingly incorporated herein by reference. The foregoing materials are presented for purposes of illustration only, and the invention includes a variety of different colors.

In one aspect of the present invention, the flavor composites include up to about 7% by weight of the total composite, of seed particles containing a quantity of sorbitol. The seed particles may be derived from previously prepared quantities of the flavor composite, or may comprise ground crystals or fines of sorbitol alone. The seed particles are added for the purpose of initiating the solidification of the sorbitol mixture, after the flavor has been incorporated therein.

In the instance where the seed particles comprise fines remaining from the granulation of an earlier batch of the flavor composite after its solidification, the present invention confers an economy of manufacture. The seed particles of this embodiment may possess a composition that is equivalent in materials and their amounts, to the mixture under preparation, though some variation may exist from batch to batch. Also, while the flavor incorporated in the seed particles may correspond with that of the composite under preparation, the seed particles having a differing flavor may be selected and used, in the instance where the respective flavors may be favorably compatible and in combination would yield a desirable flavor effect.

In an alternate embodiment hereof, where the seed particles are derived from monolithic sorbitol crystals, such crystals may be prepared from a particular variety of sorbitol having a crystalline structure known as the gamma crystalline polymorph. This specific crystalline structure, and its associated method of preparation are disclosed in U.S. Pat. No. 3,973,041, to DuRoss, accordingly incorporated herein. Sorbitol prepared thereby possesses a heat of fusion ranging from 38 to 46 calories per gram, and a melting range of from 96° to 101° C., and purportedly offers improved shelf stability in confectionary products.

Sorbitol having the gamma polymorphic crystal structure can be prepared merely from seed crystals having this structure, as they will promote the formation by the sorbitol present in the remainder of the batch, of a flavor composite having sorbitol with the same cyrstal structure. Naturally, the sorbitol in the remainder of the batch may likewise originate in the gamma form, however, this is unnecessary. Additionally, the promotion of gamma crystal formation in the entire batch by this selective seeding technique assures that those fines retrieved from the granulation of the batch, will contain gamma crystalline sorbitol useful for seeding subsequent composite batches.

In accordance with a further aspect of the present invention, a method for preparing the flavor composites is disclosed, comprising mixing a quantity of sorbitol, mannitol and saccharin, and thereafter heating the mixture to a temperature of about 200° C. The heated mixture is then cooled to a temperature below 70° C., whereupon the flavor is added, preferably under agitation to achieve uniform dispersion in the mixture. The seed particles are thereafter added to the mixture under agitation, and the mixture is then permitted to solidify, after which the completed flavor composite is recovered.

The first step of the present method comprises the mixture of the sorbitol, mannitol and saccharin components. These materials may be combined in granular form prior to being heated, or may be individually heated and then mixed as liquids.

After mixing, the sorbitol, mannitol and saccharin are heated to a temperature on the order of about 200° C., to form an essentially stable, clear liquid. In practice, a slight brownish tint is sometimes observed due to slight caramelization of the sorbitol. During this heating step, water vapor evolution is observed and slight boiling takes place. At the point where the mixture reaches 200° C., any coloring desired in the final composite may be added.

The above mixture is thereafter cooled to a temperature below 70° C. Cooling may be conducted on a cold water bath, and the mixture may be slightly agitated. Naturally, other techniques and means for cooling the mixture may be employed, and the invention is not limited to the specific use of a water bath.

After the mixture drops below the temperature of 70° C., and preferably reaches the temperature of about 68° C., the flavor may be added with sufficient agitation to thoroughly disperse the flavor in the mixture. As noted earlier, an advantage of the present invention is that flavor may be incorporated at this lower temperature, with a resulting minimization of flavor loss due to volatization or "flash off". Thus, greater quantities of flavor may be added and incorporated into the present composite.

The flavor is preferably added slowly while under agitation to achieve thorough mixture, and preferably is added in aliquot portions, to minimize surface residence of the flavor on the sorbitol. It has been found that, if the complete incorporation of the flavor into the sorbitol is not achieved, and some flavor remains on the surface of the sorbitol, the flavor remaining on the sorbitol surface may volatize due to the action of the mixer.

After the addition of the flavor is complete, one or more of the types of seed particles mentioned earlier, are added to the resulting mixture, to promote solidification. The seed particles are likewise added under agitation which is maintained for a time and intensity sufficient to thoroughly incorporate the seeds into the mixture.

The mixture is now ready for solidification, and may be molded to a variety of shapes, depending upon the contemplated end use. For example, the composite while still liquid, may be cast upon a flat surface, to form a sheet of material. In commercial processes, casting may be performed against a moving cooled surface, in which case the material will solidify during its travel and form a continuous sheet. Alternately, the liquid may be cast into individual trays, so that separate sheets will form.

In addition to the above, the liquid mixture may be cast into trays having defined therein recesses appropriately shaped so that the resulting solid composite will comprise a plurality of tablets or droplets, suitable upon solidification, for consumption as sugarless candies. Alternately, the sheets or tablets may be granulated to form particles or beads, that may be incorporated into a variety of products as the flavoring component. Preferably, the present composite upon solidification, is ground to form particles having approximately 25 mesh size, for use as the flavoring component of a variety of products. In a particular aspect of the present process, the solid composite may be ground with a commercial granulator having a size 18 mesh screen. The particles passing therethrough are then placed on a 25 mesh screen, and particles remaining thereon are retained as the final granular product. In such instance, the fines passing through both screens are gathered and may be later utilized as the seed particles for the preparation of further batches of the composite, as discussed earlier in detail.

In particulate form as described, the present flavor composite may be incorporated into a variety of products as the flavoring component, and, for example, may be utilized in chewing gums, either alone, or in combination with other flavor forms. For example, the beads or particles may be used in combination with flavor additives in powdered or liquid form, or both, to provide a composite flavor sensation. The present flavor composites provide prolonged flavor sensation and release, and could thereby be used in cooperation with the same or different flavors within a given product, to provide a continuous flavor release extending over an increased time span.

The flavor composites of the present invention are useful in a variety of comestible products, in addition to their preparation as sugarless candies, and as the flavor constituent of chewing gums. Thus, for example, the present composites may be utilized to provide both flavor and sweetness to foods such as breakfast cereals, dairy product analog toppings, flavored fillings for baked goods, and the like.

The present invention will be better understood from a consideration of the following illustrative examples, wherein all percentages expressed, are deemed percentages by weight.

EXAMPLE I

A flavor composite was prepared, which utilized 77.85% sorbitol, 10% spearmint flavor, 5% mannitol, 0.15% saccharin and 7% of seed particles of similar composition derived from an earlier preparation. The sorbitol, mannitol and saccharin were mixed and heated to about 200° C., and thereafter cooled on a water bath with slight agitation to about 68° C. As the temperature approached 68° C., the flavor was added slowly in aliquot portions, and with sufficient agitation to achieve thorough mixture. Thereafter, the seeds were incorporated with agitation and the resulting mixture was poured into trays to set up.

Upon solidification, the sheets of composite were ground in a Stokes granulator through a size 18 mesh screen. The particles passing through the screen were then placed on a 25 mesh screen, and those particles remaining thereon were recovered for incorporation into comestible products. The particles were thereafter tested for shelf life, and found to retain majority of the flavor over periods of time of up to one year.

EXAMPLE II

A similar formulation was prepared to that disclosed in Example I, with the exception that Kohnstamm Imitation Cherry Oil P798 was utilized for the cherry flavor, and was added in an amount of about 2%. The quantities of mannitol, saccharin and seed particles remained the same, with the balance comprising sorbitol. The preparation of this composite otherwise proceeded identically to that of Example I, and the resulting flavor beads were similarly tested for shelf life, and found to retain their flavor over similar storage periods.

EXAMPLE III

Five flavor encapsulations were prepared in the manner set forth in Example I, with the respective flavors listed in Table I, below. Each of the flavors was prepared and tested in both chunk form, derived after solidification and initial fracture of the sheet material, as well as after granulation. The respective samples were initially categorized for the theoretical amount of total flavor incorporated, and were thereafter actually measured to determine the total amount of flavor contained, and the respective percentages of that flavor actually encapsulated, as well as disposed on the surface of the composite. The results of these measurements is likewise set forth in Table I.

TABLE I

MEASUREMENT OF PERCENT OF FLAVOR ENCAPSULATION

| SAMPLE NO. | FLAVOR | FLAVOR CONTENT (%) | | |
|---|---|---|---|---|
| | | TOTAL | SURFACE | ENCAPSULATED |
| 1 | Peppermint - Chunk | 8.1 | 3.3 | 59.3 |
| | Peppermint - Ground | 7.5 | 4.6 | 38.7 |
| | Theoretical | 10 | 0 | 100 |
| 2 | Spearmint - Chunk | 9.4 | 0.76 | 91.9 |
| | Spearmint - Ground | 6.8 | 1.29 | 81.0 |
| | Theoretical | 10 | 0 | 100 |
| 3 | Cinnamon - Chunk | 4.5 | 0.24 | 94.7 |
| | Cinnamon - Ground | 4.3 | 1.31 | 69.5 |
| | Theoretical | 10 | 0 | 100 |
| 4 | Fruit - Chunk | 8.3 | 0.62 | 92.5 |
| | Fruit - Ground | 6.5 | 0.66 | 89.8 |
| | Theoretical | 10 | 0 | 100 |
| 5 | Bubble - Chunk | 8.7 | 0.48 | 94.5 |
| | Bubble - Ground | 8.0 | 1.25 | 84.4 |
| | Theoretical | 10 | 0 | 100 |

The results in Table I suggest that, with the exception of Sample No. 1, the majority of the flavor content of the composite was encapsulated, rather than disposed on the surface of the composite. This reflects the advantage of the present composite, in that the temperature of preparation is sufficiently reduced to minimize flavor "flash off". This further suggests that the flavor thus retained in encapsulated form, will exhibit improved shelf life, as release will occur only upon fracture of the capsules.

EXAMPLE IV

A series of chewing gum samples were prepared that utilized the ground particles of the flavor composites prepared in Example III, above. Specifically, conventional sugarless chewing gum was modified to provide two variations of sorbitol flavor composite incorporation: in a first modification, the sorbitol beads containing the flavor replaced 20% of the liquid flavor conventionally employed; in the second modification, sorbitol beads replaced 20% of the liquid flavor, and an additional 10% of flavor was added in the form of a further quantity of sorbitol beads. The actual amount of beads utilized to provide the foregoing percentages of liquid flavor replacement, was derived from the measurements of total flavor and encapsulated flavor of the samples of ground composites set forth in Table I, above.

Each of the flavors set forth in Example III was therefore prepared in two variations, and a third control sample was likewise prepared to facilitate panel testing of each flavor. A panel of four adults was given a total of fifteen samples, representing each of the five flavors initially investigated in Example III. Each of the panelists chewed the respective samples for an identical period of time, and recorded subjective observations of flavor delivery. The general conclusions derived from the individual observations of the panelists are set forth below with reference to each of the five flavor categories.

1-PEPPERMINT

No significant difference between either of the encapsulated flavor-containing samples, and the control gum sample could be determined. A slightly harsher flavor was noted in the sample with the increased flavor while a metallic note was found in all of the samples, that is believed to be derived from the liquid flavor.

2-SPEARMINT

Of the three samples tested, the sample containing 10% extra flavor provided by the further increment of flavor prepared in accordance with the present invention, was found to be most balanced, with the best sweetness and flavor impact. The control was observed to be slow in delivery.

3-CINNAMON

In similar fashion to spearmint, described above, the chewing gum having 10% additional flavor provided by the flavor containing composites of the present invention, was found to have the best balance in sweetness and flavor impact. Likewise, the control was found to be slow in flavor delivery.

4-FRUIT

The chewing gum prepared with 20% of the liquid flavor replaced by the flavor containing composite prepared by the present invention, was found to have the most rounded flavor and sweetness. The control was found to be oversweet and the sample having 10% additional flavor was found to be harsh.

5-BUBBLE GUM

No significant difference was found between the control sample and either sample having the flavor composite of the present invention.

From the foregoing subjective observations, the panel concluded that the major effect of the sorbitol encapsulated flavor additions, was to change the delivery of the sweetness and flavor. As this effect was found to be favorable in some flavors and not in others, it was determined that flavor enhancement could be achieved when the proper level of the sorbitol encapsulated flavor composites was added. It was noted in conclusion that three out of the five flavors tested were improved by the substitution of the sorbitol encapsulated flavor composites for a like quantity of conventional liquid flavor.

Flavor composites prepared with similar composition to those disclosed above, may be incorporated into the flavor ingredient of products such as chewing gums, in an amount, for example, of about 20% of the total flavor content, and flavor sensation of the chewing gum will be enhanced and extended.

This invention may be embodied in other forms or carried out in other ways without departing from the spirit or essential characteristics thereof. The present invention is therefore to be considered as in all respects illustrative and not restrictive, the scope of the invention being indicated by the appended claims, and all changes which come within the meaning and range of equivalency are intended to be embraced therein.

What is claimed is:

1. A method for preparing a flavor composite comprising:
   a. preparing a eutectic mixture comprising about 5 to about 6% mannitol; about 0.15 to about 0.16% saccharin, and the remainder sorbitol, said percents being by weight of the final composite;
   b. heating said mixture to a temperature of about 200° C.;
   c. cooling said mixture to a temperature below 70° C.;
   d. adding at least one flavor to said mixture under agitation to uniformly disperse said flavor therein;
   e. adding to said mixture under agitation, a quantity of seed particles containing a quantity of sorbitol;
   f. permitting said mixture to solidify; and
   g. recovering said flavor composite.

2. The method of claim 1 wherein said seed particles are prepared from a previously prepared quantity of said flavor composite.

3. The method of claims 1 or 2 wherein up to about 7% by weight of said seed particles are added under agitation.

4. The method of claims 1 or 3 wherein said flavor is selected from essential oils, synthetic fruit flavors, natural fruit flavors, bean-derived flavors, wine-derived flavors, pungent materials, and mixtures thereof.

5. The method of claims 1 or 3 wherein said flavor is selected from cherry, cinnamon, spearmint, peppermint, birch, anise, apple, pear, peach, strawberry, apricot, orange, watermelon, banana, coffee, cocoa, curacao zin, affinin, pepper, mustard, and mixtures thereof.

6. The method of claim 1 wherein said mixture is cooled with slight agitation.

7. The method of claims 1 or 6 wherein said mixture is cooled to a temperature of about 68° C.

8. The method of claim 1 wherein said flavor is added slowly and in aliquot increments, and said mixture is agitated an amount sufficient to fully disperse said flavor therein.

9. The method of claim 1 wherein said flavor composite is recovered by casting in a shallow tray to form a sheet material.

10. The method of claim 1 wherein said flavor composite is recovered as a plurality of candy-shaped pellets.

11. The method of claim 1 wherein said flavor composite is recovered in particulate form.

12. The method of claim 11 wherein said flavor composite is first cast on a flat surface to form a solid sheet, and said sheet is thereafter granulated to a particle size on the order of 25 mesh.

13. The product produced by the process of claim 1.

14. A method of preparing a flavored comestible by incorporating in a comestible the product produced by the process recited in claim 1.

15. A method of preparing a flavored chewing gum by incorporating into a chewing gum formulation the product produced by the process recited in claim 1.

* * * * *